United States Patent [19]

Nomura et al.

[11] Patent Number: 5,893,909
[45] Date of Patent: Apr. 13, 1999

[54] INFORMATION PROCESSING APPARATUS AND INFORMATION PROCESSING METHOD

[75] Inventors: Takahiko Nomura; Tan Hazama, both of Nakai-machi, Japan

[73] Assignee: Fuji Xerox Co., Ltd., Tokyo, Japan, JPX

[21] Appl. No.: 08/912,669

[22] Filed: Aug. 18, 1997

[30] Foreign Application Priority Data

Aug. 21, 1996 [JP] Japan .................................. 8-238585

[51] Int. Cl.⁶ .................................................. G06F 17/00
[52] U.S. Cl. .................................................. 707/5; 707/203
[58] Field of Search ...................... 707/1–5, 10, 100, 707/102, 104, 200–203

[56] References Cited

U.S. PATENT DOCUMENTS

| | | | |
|---|---|---|---|
| 5,347,653 | 9/1994 | Flynn et al. | 707/203 |
| 5,704,017 | 12/1997 | Heckerman et al. | 706/12 |
| 5,768,580 | 6/1998 | Wical | 707/206 |
| 5,790,426 | 8/1998 | Robinson | 702/179 |
| 5,790,935 | 8/1998 | Payton | 455/5.1 |
| 5,813,009 | 9/1998 | Johnson et al. | 707/100 |

FOREIGN PATENT DOCUMENTS

| | | |
|---|---|---|
| A-4-47366 | 2/1992 | Japan . |
| B2-5-63834 | 9/1993 | Japan . |
| A 6-121214 | 4/1994 | Japan . |
| A 6-123412 | 5/1994 | Japan . |
| A-6-274493 | 9/1994 | Japan . |
| A-7-28834 | 1/1995 | Japan . |
| A-7-84858 | 3/1995 | Japan . |
| A-7-110809 | 4/1995 | Japan . |
| A-7-311764 | 11/1995 | Japan . |

OTHER PUBLICATIONS

"GroupLens: An Open Architecture for Collaborative Filtering of Netnews", Resnick et al., CSCW94, pp. 175–186, 1994.

Primary Examiner—Maria N. Von Buhr
Attorney, Agent, or Firm—Oliff & Berridge, PLC

[57] ABSTRACT

The present invention provides an information processing apparatus to administer a set of evaluation units for providing evaluation including classification, providing comments and so on to information based on the history of evaluation in the past. A data object or information specifying the data object is stored as an information unit in an information unit administering element to be administered, and a set of evaluation units (item such as classification, providing comments and so on) is stored in an evaluation unit set administering element and administered. Every time evaluation is provided to the information unit, information about the relation of association among the information unit, evaluation unit and the set of evaluation units is stored in an evaluation history administering element as a result of evaluation to be administered. Accordingly, a user is able to know by which set of evaluation units the evaluation is provided to a certain piece of information in detail by referring to the result of evaluation administered in the evaluation history administering element.

11 Claims, 17 Drawing Sheets

| EVALUATION UNIT SET ID | FORM1 |
|---|---|
| LIST OF EVALUATION UNITS | [EVAL1, EVAL2, EVAL3, EVAL8, EVAL9, EVAL11] |
| EVALUATION FORM NAME | MULTIMEDIA-RELATED |
| CREATOR | USER1 |
| DATE OF CREATING | 1996.4.18.16:21 |

FIG.2

| EVALUATION UNIT ID | EVAL1 |
|---|---|
| EVALUATION UNIT NAME | VIDEO CONFERENCE |
| CREATOR | USER2 |
| DATE OF CREATING | 1996.4.18.18:21 |

FIG.3

| INFORMATION UNIT ID | ITEM1 |
|---|---|
| INFORMATION UNIT NAME | JAPANESE PATENT APPLICATION LAID-OPEN NO. 6-123234 |
| POINTER | /USER/HOME/NOMURA/DOC/PATENT/PAT6-123234 |
| CREATOR | USER2 |
| DATE OF CREATING | 1996.4.18.18:21 |

FIG.4

| USER ID | USER2 |
|---|---|
| USER NAME | NOMURA |
| PASSWORD | ****** |

FIG.5

| GROUP ID | GROUP1 |
|---|---|
| GROUP NAME | MULTIMEDIA-G |
| USER LIST | [USER2, USER3, USER9, USER11] |

FIG.6

| DATE OF EVALUATION | 1996.4.18.18:21 |
|---|---|
| USER | USER2 |
| EVALUATION UNIT SET | FORM1 |
| EVALUATION UNIT | EVAL2 |
| INFORMATION UNIT | ITEM9 |

FIG.7

| DATE OF EVALUATION | USER | EVALUATION UNIT SET | EVALUATION UNIT | INFORMATION UNIT |
|---|---|---|---|---|
| 1996.4.16.10:11 | USER4 (SATO) | FORM4 (HYPERTEXT) | EVAL12 (PATENT) | ITEM32 (JAPANESE PATENT APPLICATION LAID-OPEN NO. 7-432543) |
| 1996.4.18.18:21 | USER2 (NOMURA) | FORM1 (MM-SURVEY) | EVAL2 (COMPRESSION) | ITEM9 (MPEG GUIDE) |
| 1996.4.19.9:11 | USER3 (YAMADA) | FORM7 (EVALUATION SHEET) | EVAL12 (PATENT) | ITEM19 (JAPANESE PATENT APPLICATION LAID-OPEN NO. 6-121214) |
| 1996.4.19.10:41 | USER3 (YAMADA) | FORM7 (EVALUATION SHEET) | EVAL29 (IMPORTANT) | ITEM12 (INTELLIGENT RETRIEVAL SYSTEM) |
| 1996.4.19.9:11 | USER3 (YAMADA) | FORM7 (INFRINGEMENT SURVEY SHEET) | EVAL12 (PROBLEMATIC) | ITEM19 (JAPANESE PATENT APPLICATION LAID-OPEN NO. 6-121214) |
| 1996.4.19.12:21 | USER4 (SATO) | FORM4 (HYPERTEXT) | EVAL21 (HISTORY) | ITEM32 (HYPERNAVIGATION) |

FIG. 16

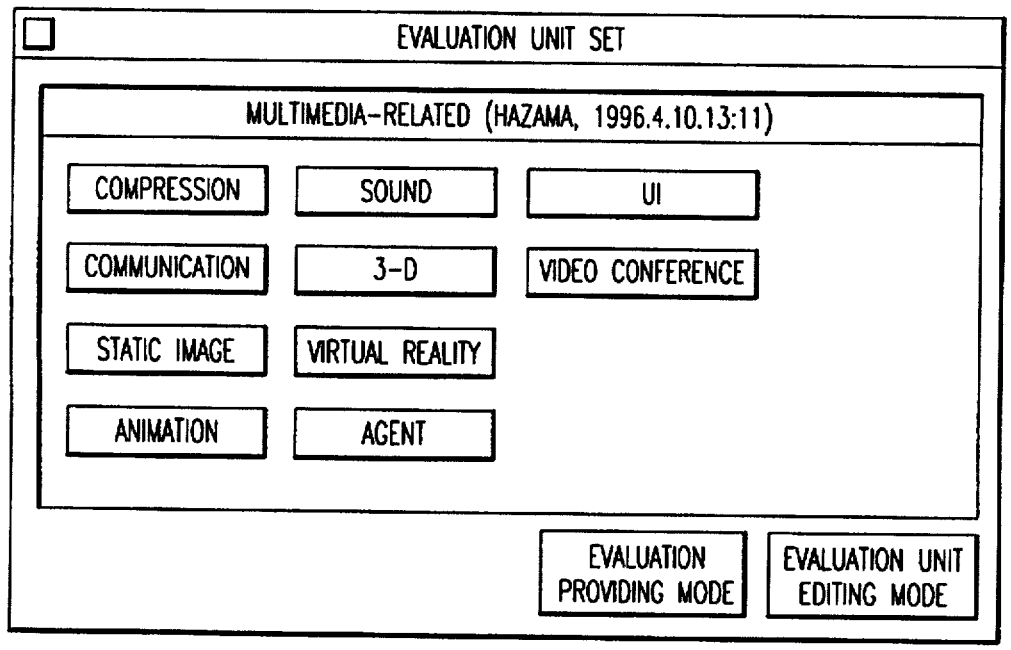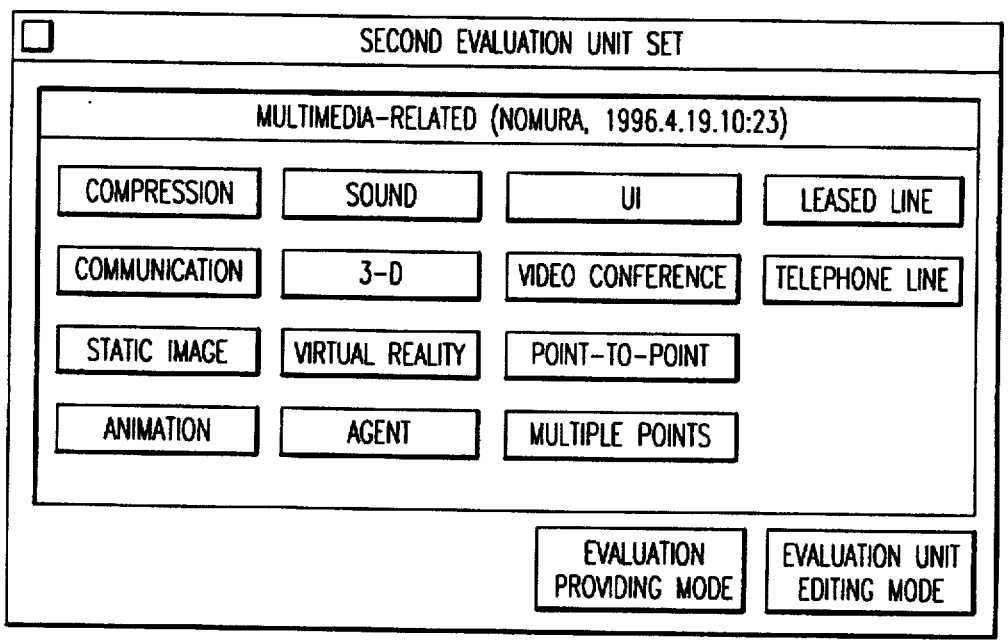
FIG.23

INFORMATION PROCESSING APPARATUS AND INFORMATION PROCESSING METHOD

BACKGROUND OF THE INVENTION

1. Field of the Invention

The present invention relates to an information processing apparatus and information processing method for administering an evaluation system (a set of units for evaluation) which provides evaluation including classification, providing comments or the like to a data object, for example, a document that can be electronically accessed.

2. Discussion of the Related Art

The environment for utilizing electronic information has been recently developed by introducing word processors, various types of filing systems, database systems, network systems and so on to offices. The patents, papers, many kinds of references or the like in all over the world are now stored in the on-line database, patent information is stored in CD-ROM, and moreover, the Internet has been widespread, whereby the amount of electronic information available in the offices is explosively increased. Accompanying thereto, importance of sharing information in organizations in the offices has been recognized.

However, most of the electronic information utilized in the organizations is an electronic replacement of information conventionally represented in paper documents. With only such replacement, it is difficult to say that the advantages generated by the use of the electronic information are not fully obtained. For appropriately acquiring the necessary information, evaluation including classification, providing comments and so forth should be provided to the information according to unique meanings in the organization.

Conventionally, several methods of mutual offering of information which has a unique meaning were proposed for accelerating the information sharing. One of them is to share the comments for the information, which is disclosed by Japanese Patent Application Laid-Open Nos. 6-274493 (1994) and 7-311764 (1995). These inventions have a purpose to support the collaborative writing, which administer comments given to the document by each member and make it possible to retrieve and display the comments. Each member gives arbitrary comments, and consequently, there is no problem if information is shared in a group of the small number of people, but in the case where information is shared in a large organization, or a large amount of pieces of information are collected in a long period, there occurs a deficiency that it is difficult to find from what viewpoint the comments are given to each piece of information. For example, if only the comment "Important" has been given to a piece of information, it is impossible to know for what purpose the information is "important".

As a tool of offering subjective ratings about an article to one another, for example, GroupLens disclosed by "GroupLens: An Open Architecture for Collaborative Filtering of Netnews", Resnick et al., CSCW94, pp. 175–186, 1994 is known. This makes it possible for users to freely provide 5-grade ratings to every article in the news on an electronic bulletin board. When a user refers to an article, the user can determine the degree of importance with reference to ratings given by other users.

However, there is a problem that GroupLens is poor in expression because the basic rating system such as classification is fixed. Even if the rating system could be renewed, it would be necessary to unify the will of the users for halfway changing of the rating system. Therefore, it is difficult to create a new rating system.

There is also a method of constructing classification categories for uniquely providing a meaning to each of pieces of information and classifies the pieces of information using the classification categories.

Inventions disclosed by Japanese Patent Applications Laid-Open Nos. 5-63834 (1993), 7-28834 (1995) and 7-110809 (1995) store the classification categories and carry out the proper choices or re-classification of information such as documents by selecting the items corresponding to the object information from the categories. An invention disclosed by Japanese Patent Application Laid-Open No. 7-84858 (1995) also administers the classification categories, and in particular administers files from plural classification viewpoints.

However, a system for providing meanings to information in an organization may be changed by various external elements such as reorganization, change of research direction, the trend of technology and reconstruction of the technological map by development of new technologies. Therefore, if the classification is continuously carried out for a long period, the change of the classification categories is required in the course of carrying out the classification. This causes a problem that it is hard to recognize by at what time of classification categories each piece of information was classified.

For example, between classification systems having categories "large" and "small", and categories "large", "medium" and "small", classification into the same category "small" has different meanings. Accordingly, if the category "medium" is added, it is necessary to reconsider whether each of all pieces of information previously classified into "large" or "small" belongs to the category "medium" or not.

In conventional methods of category administration, the reconsideration of the classification was impossible because the categories before updating were lost. If a user carries out such reconsideration immediately before the updating, it costs a great deal. Besides, in the case where the categories are shared, if a person changes the categories from his/her own viewpoint, it results in that the categories are changed without the approval of other people using the categories. Therefore in the conventional methods, it has been required that the classification categories have been continuously used as they were fixed, or that the categories have been changed on the consensus of the people after a thorough discussion.

Another method is to store the categories in the past and reproduce one of them. An invention disclosed by Japanese Patent Application Laid-Open No. 4-47366 (1992) stores the history of data structures in the past and reproduces a data structure at a certain point of time; thereby it is possible to perform information retrieval based on the reproduced data structure.

However, the purpose of the invention is to restore the data structure at a certain point of time based on the operations in the past. The plural data structures are not under version administration by names, for example, and relations among the plural data structures in the past are not stored. Therefore, according to this invention, a data structure after updating cannot be shown against a specific data structure in the past to support re-providing of evaluation, and besides, it is impossible to select necessary items from the classification categories used in the past to create new classification categories.

The evaluation categories used for evaluation such as classification or providing comments are not the given ones, but they are required to be changed in the course of collecting information. Accordingly, to support information evaluation in the organization in a long period of time, it is necessary to resolve the following problems.

(1) Though it is possible to make a lot of variations of the evaluation categories in accordance with the change of the environment or customization by each member, it is difficult to select or construct the categories which include items sufficient to provide evaluation.

(2) When the evaluation categories are referred to, it is impossible to recognize whether the categories are the latest ones or not. If the categories are not the latest, it is required to provide evaluation again, but it costs very much.

SUMMARY OF THE INVENTION

The present invention has been made in view of the above circumstances and has an object to provide an information processing apparatus which offers a shared evaluation categories, namely a set of candidates of evaluation attribute to be provided, for evaluation of information such as classification or providing comments (i.e., providing meanings), and moreover proposes to support construction of new evaluation categories by retrieving evaluation categories used in the past based on a history of providing evaluation and extracting necessary evaluation categories therefrom. That is, selection of an appropriate evaluation category is available based on the historical information such as the name of the evaluation form, the user who provided the evaluation, the information unit to which the evaluation was provided, and so on, from the candidates of all retroactive evaluation categories (including updates), not by version control of the evaluation categories in accordance with the names of the categories only.

The information processing apparatus according to the present invention also has a purpose, in the case where evaluation categories are edited and the user is going to refer to the categories before editing or to use them for evaluation, to inform the user that the categories are updated to be the latest and what type the categories become by editing, and further to support re-providing evaluation using the latest categories to the data objects that were evaluated using old categories.

Additional objects and advantages of the invention will be set forth in part in the description which follows and in part will be obvious from the description, or may be learned by practice of the invention. The objects and advantages of the invention may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, an information processing apparatus of the present invention for providing evaluation information to a data object, comprises an information unit administering element for storing a data object to be an object of evaluation, an evaluation unit set administering element for storing a plurality of sets of evaluation units, each of which includes a plurality of evaluation units used for evaluation, an evaluation unit set editing element for editing at least one of the plurality of evaluation units in one of the plurality of sets of evaluation units stored in the evaluation unit set administering element, a storage directing element for directing the set of evaluation units in which at least one of the plurality of evaluation units is edited by the evaluation unit set editing element to be stored in the evaluation unit set administering element, an evaluation providing element for associating one of the plurality of evaluation units in one of the plurality of sets of evaluation units with the data object to be the object of evaluation in accordance with a user's direction, and an evaluation providing history administering element for storing a result of evaluation including information about relation of association among the data object, the evaluation unit associated with the data object by the evaluation providing element and the set of evaluation units used for evaluation.

In other words, the data object or information for identifying the data object is stored and administered in the information unit administering element, and the sets of the evaluation units, each of which includes evaluation units (items such as classification, providing comments or the like) are stored and administered in the evaluation unit set administering element. Every time evaluation is provided to one of the information units, information about the relation of association among the three, namely, the information unit, evaluation unit and the set of evaluation unit is stored in the evaluation history administering element as a result of evaluation.

The result of evaluation includes information such as a date of providing evaluation, an evaluator, as well as the evaluation unit, information unit and the set of the evaluation units. The user is able to know by which set of evaluation units (namely, an evaluation category) the evaluation is provided to a certain piece of information in detail by referring to the result of evaluation administered in the evaluation history administering element.

For example, in the case of selecting the category used by the group leader, the group leader is selected as the user, and the corresponding sets of evaluation units are displayed in the order of being used for evaluation. In another example, in the case where the category recently used by any of the member of the group is to be selected, the group is selected as the user and the corresponding sets of evaluation units are displayed in the order of being used for evaluation. If the category used for classifying "patent" is to be selected, the classification item (evaluation unit) is selected and the corresponding sets of evaluation units are displayed in the order of being used for evaluation. As a still another example, if the category used for classifying and evaluation of an object "document A" is to be selected, the object is selected and the sets of evaluation units used for evaluating the object are displayed in the order of being used.

The evaluation unit set administering element conducts version control of the sets of evaluation units per name of each set and a set of evaluation units retains plural versions of a set though it is the set of evaluation forms having the same name.

Thereby, if a set of evaluation units is to be referred to, the evaluation unit set detecting element detects the set having the latest date of generation and informs the user. Consequently, it is possible to properly use any of the sets of evaluation units each of which is customized by each of the plural users, and is also possible to regard the sets of evaluation units other than the latest version as candidates of the sets of evaluation units to be used in future evaluation.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIG. 2 illustrates an example of a data structure of a set of evaluation units;

FIG. 3 illustrates an example of a data structure of an evaluation unit;

FIG. 4 illustrates an example of a data structure of an information unit;

FIG. 5 illustrates an example of a data structure of information about a user;

FIG. 6 illustrates an example of a data structure of information about a group;

FIG. 7 illustrates an example of a data structure of a result of evaluation;

FIG. 16 illustrates another example of the data structure of a result of evaluation;

FIG. 23 illustrates an example of a display for selecting a set of evaluation units on a screen.

DETAILED DESCRIPTION OF THE PREFERRED EMBODIMENTS

Preferred embodiments of an information processing system according to the present invention are now described in detail based on the drawings.

First Embodiment

Figure 1:
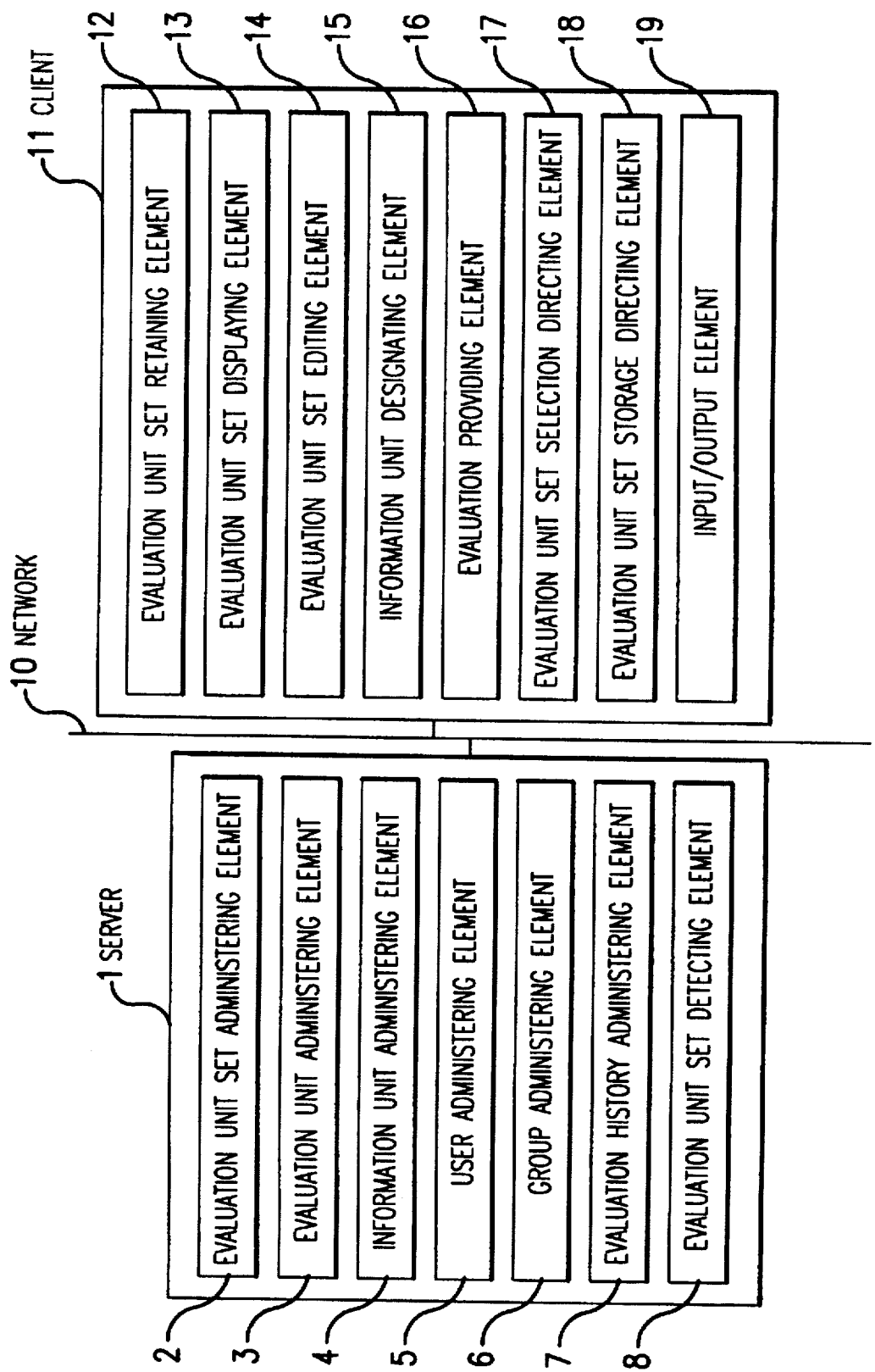
FIG. 1 shows the construction of the first embodiment of an information processing apparatus according to the present invention.

FIG. 1 shows the construction of the information processing apparatus according to the present invention, which has a server 1 and a client 11 connected to each other through a network 10. A workstation or a personal computer is used as each of the server 1 and client 11.

In this embodiment, information processing is conducted in a client-server style, but it is unnecessary to limit the construction thereto. For example, the construction can be implemented in a single computer without using a network.

The server 1 includes an evaluation unit set administering element 2, an evaluation unit administering element 3, an information unit administering element 4, a user administering element 5, a group administering element 6, an evaluation history administering element 7 and an evaluation unit set detecting element 8. With these elements 2–8, the server 1 administers information shared by plural users, such as an evaluation unit, a set of evaluation units, an information unit and so on.

The evaluation unit set administering element 2 stores all sets of evaluation units created in the past and administers them. Here, the set of evaluation units is a set of choices for providing evaluation such as classification or providing comments. As shown in an example in FIG. 2, each set of evaluation units includes pieces of information as attributes, for example, an evaluation unit set identifier for identifying a set of evaluation units, a list of evaluation units which are the elements of a set of evaluation units, a name of evaluation form which is a name of a set of evaluation units, information for identifying a user who created a set of evaluation units, a date on which a set of evaluation units was created and so forth, as attributes.

The evaluation unit administering element 3 stores and administers all evaluation units created in the past. Here, an evaluation unit is each of the choices (items) for providing evaluation to an information unit designating a data object such as a document. In evaluation of each information unit, an evaluation item indicating an evaluation unit name representing the contents of a classification or comments corresponds to the relevant information unit.

As shown in an example in FIG. 3, each evaluation unit includes pieces of information as attributes, such as an evaluation unit identifier for identifying the evaluation unit, an evaluation unit name indicating a name of an evaluation item, information for identifying a user who created the evaluation unit and a date on which the evaluation unit was created.

As described later, information about the relation of association between the information unit and the evaluation unit is stored in the evaluation history administering element 7 and administered.

The information unit administering element 4 stores and administers the information units for referring to a data object which is an object of evaluation. As shown in an example in FIG. 4, each information unit includes pieces of information, for example, an information unit id for identifying the information unit, an information unit name indicating the name of the information unit, a pointer for referring to corresponding data object, information for identifying a user who created the information unit, a date on which the information unit was created and so on, as attributes.

The user specifies a data object such as a document to associate it with an evaluation unit, that is, the user provides evaluation, whereby an information unit is created. In this provision of evaluation, the evaluation system of the apparatus obtains a pointer to the data object and requests the user to input an information unit name. As the user inputs the information unit name, the system creates the information unit and stores it in the information unit administering element 4. As described later, the information about the relation of association between the information unit and the evaluation unit is stored in the evaluation history administering element 7 and administered.

The user administering element 5 stores and administers information about each individual user who provides evaluation. As shown in an example in FIG. 5, the information about a user includes pieces of information such as a user identifier for identifying the user, a name of the user and a password of the user as the attributes.

The group administering element 6 stores and administers information about a group to which the users belong. As shown in an example in FIG. 6, the information about the group includes pieces of information as attributes such as a group identifier for identifying a group, the name of the group and a list of user identifiers of users belonging to the group.

The evaluation history administering element 7 is called by an evaluation providing element 16 which will be described later, and every time evaluation is provided (that is, every time an evaluation unit is associated with an information unit), the evaluation history administering element 7 stores the result of evaluation and administers it. Each result of evaluation, as shown in an example in FIG. 7, includes pieces of information such as a date on which evaluation were provided, an identifier of the user who provided the evaluation, an identifier of the evaluation unit set used for evaluation providing, an identifier of the corresponding evaluation unit and an identifier of the corresponding information unit, as the attributes.

That is to say, information about the relation of association among the information unit, the evaluation unit associated with the information unit by evaluation and the set of evaluation units used for evaluation is stored and administered by the evaluation history administering element 7.

The evaluation unit set retrieving element 8 retrieves the relevant set of evaluation units from the information administered by the evaluation history administering element 7 in accordance with the retrieval conditions inputted through an evaluation unit set selection directing element 17 which will be described later, and notifies the names of the evaluation forms to the client 11 after sorting them in the order of the dates on which evaluation were provided.

In other words, as the retrieval condition such as at least one of the user name, group name, evaluation unit name, information unit name and so on is inputted to the evaluation unit set selection directing element 17 of the client 11, the records satisfying the retrieval condition are retrieved from the evaluation history (results of evaluation) administered by the evaluation history administering element 7. As to the result of retrieval, the identifier of the set of evaluation units used for evaluation is obtained and the names of corresponding evaluation forms are also obtained from the evaluation unit set administering element 2, and a list of the names of evaluation forms which are arranged in the order from the latest date of evaluation is returned to the evaluation unit set selection directing element 17 of the client 11.

The client 11 includes an evaluation unit set retaining element 12, an evaluation unit set displaying element 13, an evaluation unit set editing element 14, an information unit designating element 15, the evaluation providing element 16, the evaluation unit set selection directing element 17, an evaluation unit set storage directing element 18 and an input/output element 19. With these elements 12–19, the client 11 processes the evaluation provided by the user to the data object.

The evaluation unit set retaining element 12 retains a set of evaluation units sent from the server 1, and the user selects one evaluation unit from the set of evaluation units and then provides evaluation to an information unit (a data object). The data structure of the set of evaluation units retained by the evaluation unit set retaining element 12 is the same as that shown in FIG. 2.

Figure 8:
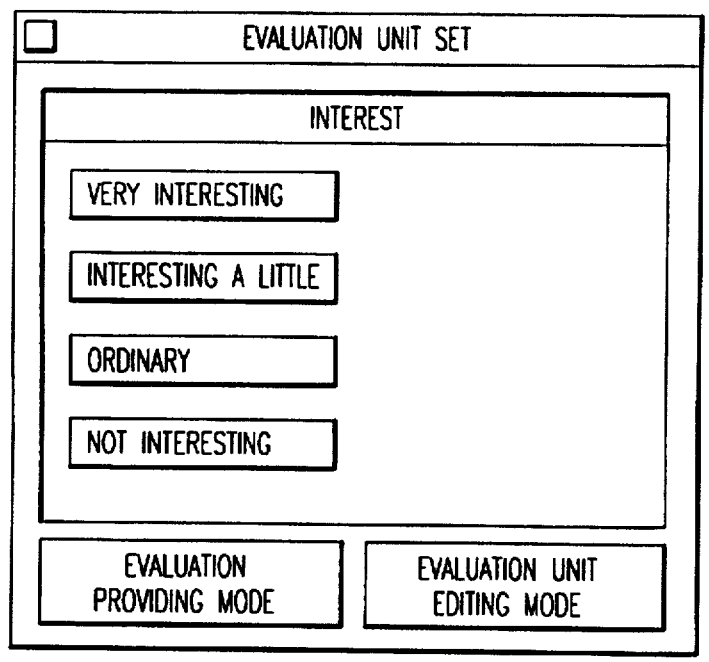
FIG. 8 illustrates an example of a display of a set of evaluation units on a screen.

The evaluation unit set displaying element 13 displays the set of evaluation units retained by the evaluation unit set retaining element 12 to the user and also displays each of the evaluation units included in the set of evaluation units as a button. Accordingly, by the user's selection of a button, associating the evaluation unit with the information unit, namely, evaluation is executed. For example, the set of evaluation units of the evaluation form name "Interest" are displayed as shown in FIG. 8, wherein each of the evaluation units "Very interesting", "Interesting a little", "Ordinary" and "Not interesting" included in the set of evaluation units is displayed as a button.

The evaluation unit set displaying element 13 also displays buttons indicating "Evaluation providing mode" and "Evaluation unit editing mode". By the user's selection of the "Evaluation unit editing mode" button, it becomes possible to carry out editing so that one or more evaluation units are added to or deleted from a set of the evaluation units or that the evaluation unit names are changed, or the like by the evaluation unit set editing element 14.

The evaluation unit set editing element 14 edits the evaluation units in the set of evaluation units retained by the evaluation unit set retaining element 12, which is put into practice by that the user selects the "Evaluation unit editing mode", as described above.

For example, it is assumed that the evaluation unit "Interesting a little" is deleted from the set of the evaluation units, and an evaluation unit "Referential" is added instead, and moreover, the evaluation form name is changed to "Profitability". In this case, a set of evaluation units is newly created with the evaluation unit name "Profitability" and evaluation units {very interesting, referential, ordinary, not interesting} as elements. If the evaluation unit name is not changed to "Profitability", the edit is to change the elements of the set of evaluation units of the evaluation unit name "Interest".

The information unit designating element 15 designates an information unit which specifies the data object such as a document to be the object of evaluation in accordance with the user's direction.

That is, as the user designates the data object such as a document file and inputs the information unit name, it is examined whether the inputted information unit has already been stored in the information unit administering element 4 of the server 1 or not. If it has been already stored, the corresponding information unit is retrieved and taken out of the information unit administering element 4 and retains it in the information unit designating element 15. To the contrary, if it has not been stored, a new information unit is created and stored in the information unit administering unit 4 of the server 1.

Thus the information unit designating element 15 retains an information unit corresponding to the data object designated by the user, and the retained information unit becomes the object of evaluation. The data structure of the retained information unit is the same as that shown in FIG. 4.

The designation of the data object by the user is executed as follows. The user specifies one of the data objects in the filing system, network or database. For the data object in the file system, the user designates an absolute path. For the data object in the network, the user designates an address, for example URL, which can uniquely identify the object. For the data object in the database, the user designates an id of the object in the database.

The evaluation providing element 16 associates an evaluation unit which is one of the elements of the sets of evaluation units retained in the evaluation unit set retaining element 13 with the information unit representing the data object retained in the information unit designating element 15, and thereby evaluation is provided.

The provision of evaluation is carried out by selecting one of the evaluation unit represented by the evaluation unit set retaining element 13. As the provision of evaluation is executed, the evaluation providing element 16 sends the date of evaluation, the identifier of the set of evaluation units used for evaluation, the identifier of the information unit and the identifier of the associated evaluation unit to the evaluation history administering element 7 to be administered.

The evaluation unit set selection directing element 17 displays the conditions for user's selection of a set of evaluation units. The conditions include a user name, a group name, an evaluation unit name and an information unit name. Names of evaluation forms matching the conditions determined by the user are displayed by the evaluation unit set selection directing element 17 in the order of being used for evaluation.

Figure 9:
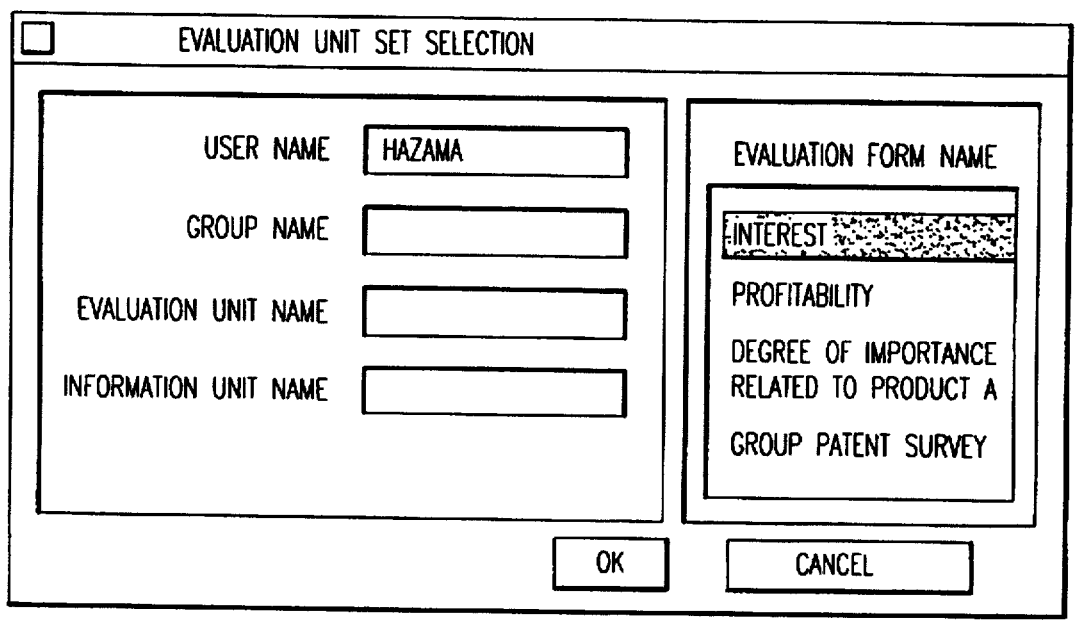
FIG. 9 illustrates an example of a display of a selected set of evaluation units on a screen.

The display by the evaluation unit set selection directing element 17 is as shown in FIG. 9. In the figure, "hazama" is designated as the user name, and in accordance with this designation, the names of evaluation forms of the sets of evaluation units used by the user hazama for providing evaluation are displayed in the right-half side area of the figure which displays the names of evaluation forms by the evaluation unit set retrieving element 8 of the server 1 in the order of the dates on which they are used for evaluation from the latest one. For example, as shown in the figure, one of the names of evaluation form "Interest" is further designated, and thereby the set of evaluation units of the latest evaluation date among the sets of evaluation units which have the name of evaluation form "Interest" and were provided evaluation by the user hazama is read out of the evaluation history administering element 7 and transferred to the evaluation unit set retaining element 12.

If, instead of the user name, a group name "Multimedia-G" is designated, the names of evaluation forms of the sets of the evaluation units to which the users belonging to the group Multimedia-G provided evaluation are displayed in the order of being used for evaluation.

For instance, if a name of evaluation unit "Very interesting" is designated, the names of evaluation forms of the sets of evaluation units used for evaluation by the evaluation unit "Very interesting" are displayed in the order of being used.

In another example, if the name of information unit "Japanese Patent Application Laid-Open No. 6-123412" is designated, the names of evaluation forms of the sets of evaluation units used for evaluation of the information unit are displayed in the order of being used for evaluation.

The evaluation unit set storage directing element 18 determines whether the set of evaluation units in the evaluation unit set retaining element 12 is to be stored in the evaluation unit set administering element 2 or not when the evaluation is provided or the set of evaluation units is read out, and provides direction of storage if necessary. Particularly, in the case where any of addition, deletion or change of the evaluation units which are the elements of the set of evaluation units is executed by the evaluation unit set editing element 14 between the evaluation or reading out of the set of evaluation units and the next evaluation or reading out of the sets of evaluation units, the storage is directed.

The input/output element 19 is constituted by input/output devices such as a display, keyboard and mouse. Here, it is assumed that the standard input/output control, for example, display of windows used by various types of applications in common, keyboard inputting, icon or button operation by a cursor, is adopted. That is, displaying, acceptance of input of direction from the user, and so on, described above are operated through the input/output element 19 as an interface.

Next, operations in processing by the information processing apparatus with the above construction are described.

At first, a process of direction of storage for the set of evaluation units are described with reference to FIG. 10. The storage direction process is called when a set of evaluation units has been read out or evaluation has been provided, and executed on condition that the change flag is on (step 1). The change flag is set to be on when the set of evaluation units retained in the evaluation unit set retaining element 12 of the client 11 is edited, and the flag is off when the set of evaluation units is stored in the evaluation history administering element 7. In other words, the change flag indicates whether the set of evaluation units is stored in the evaluation history administering element 7 or not.

If the change flag is on, the process is executed. The user is asked if it is necessary to change the name of evaluation form of the set of evaluation units (step 2), and if necessary, a name of evaluation form inputted by the user is accepted (step 3).

After the change flag is off (step 4), the set of evaluation units is written to the evaluation history administering element 7 and the process is completed (step 5).

Figure 11:
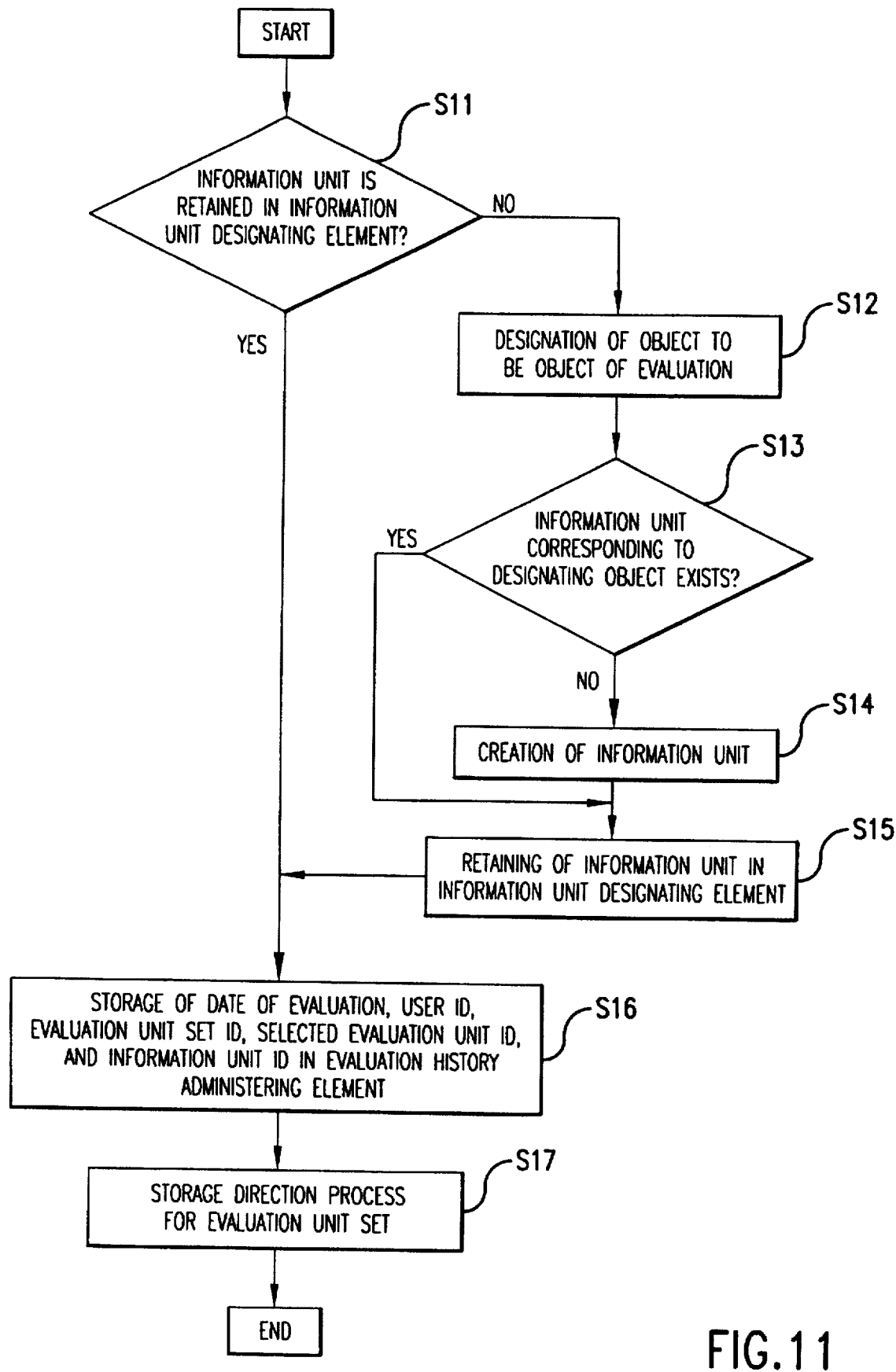
FIG. 11 is a flow chart showing an example of procedures of a process in providing evaluation.

Next, the evaluation providing process is explained with reference to FIG. 11. The evaluation providing process is executed by the evaluation providing element 16 in the case where an evaluation unit which is one of the elements of the set of evaluation units retained in the evaluation unit set retaining element 12 on condition that "Evaluation providing mode" is selected in the evaluation unit set displaying element 13.

Firstly, it is examined whether an information unit to be the object of evaluation is retained in the information unit designating element 15 or not (step 11), and if the information unit is retained, a process in step 16 described later is executed. If the information unit is not retained, processes for retaining the information unit are executed (steps 12-15).

That is to say, a direction from the user as to the data object which is the object of evaluation is accepted (step 12), and it is determined whether an information unit corresponding to the data object is in the information unit administering element 4 or not (step 13). As a result, if the information unit administering element 4 does not retain the information unit corresponding to the data object, a new information unit is created in accordance with the input by the user (step 14), and then the information unit is retained in the information unit designating element 15 (step 15).

The evaluation unit selected by the user is associated with the information unit retained in the information unit designating element 15, and the date of evaluation, the user identifier, the identifier of evaluation unit set, the identifier of the selected evaluation unit, the identifier of information unit are associated with one another, and then stored in the evaluation history administering element 7 (step 16). After that the storage direction process for the set of evaluation units is executed (step 17), and the series of processes is completed.

Figure 12:
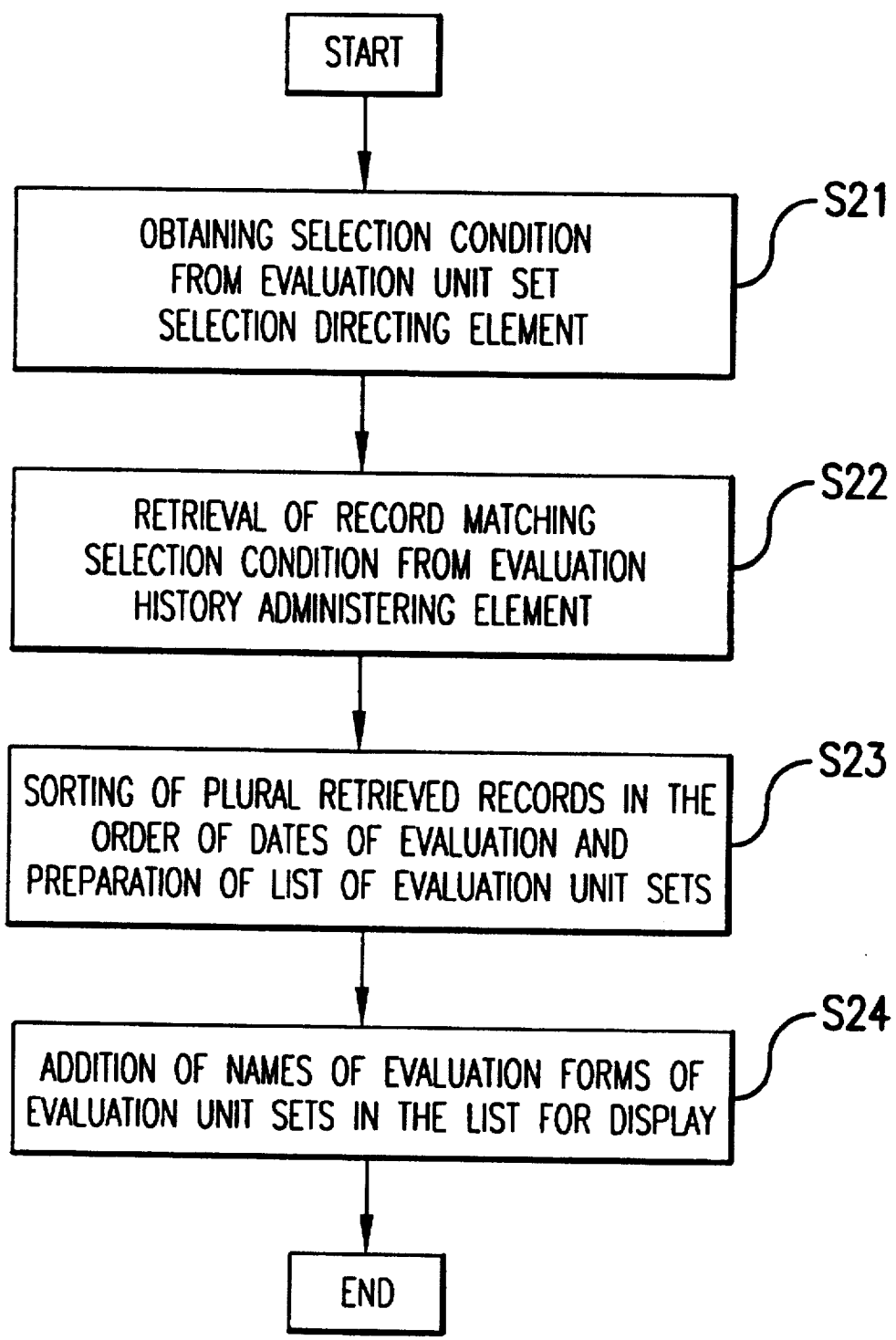
FIG. 12 is a flow chart showing an example of procedures of a display process of a name of an evaluation form according to conditions of selection.

The process of displaying the names of evaluation forms according to the selection condition is now described with reference to FIG. 12. Every time the selection condition is inputted by the user to the evaluation unit set selection directing element 17, the process retrieves a set of evaluation units satisfying the selection condition from the evaluation history administering element 7 and displays the name of evaluation form of the set of evaluation units.

In more detail, the inputted selection condition is obtained from the evaluation unit set selection directing element 17 (step 21), and a record matching the selection condition is retrieved from the evaluation history administering element 7 (step 22). If there are plural retrieved records, the records are sorted in the order of dates of evaluation and a list of the sets of evaluation units is created (step 23), and each of the sets of evaluation units is displayed in the list with the name of evaluation form (step 24).

Figure 13:
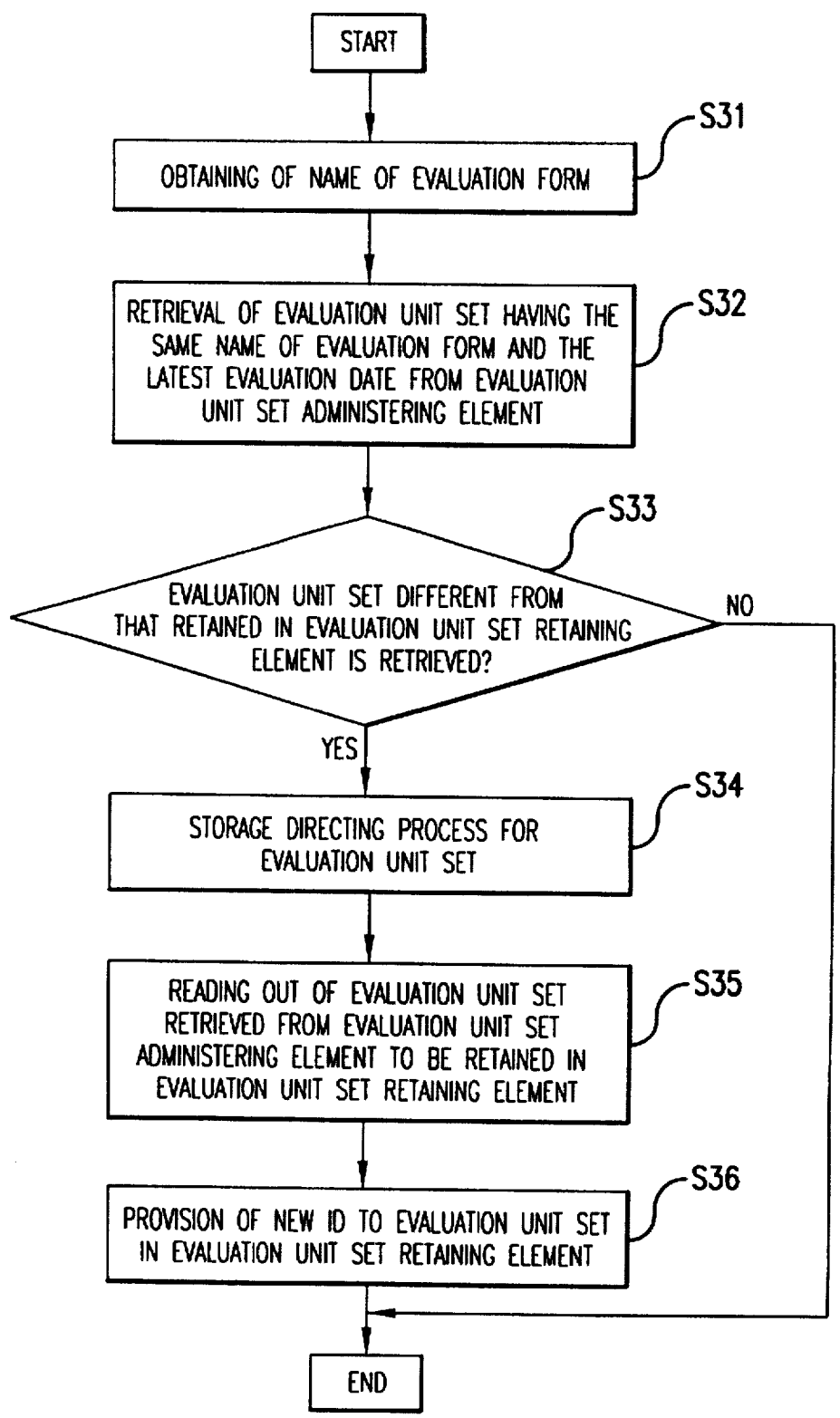
FIG. 13 is a flow chart showing an example of procedures of reading process of a set of evaluation units.

Next, the process of reading the set of evaluation units is explained with reference to FIG. 13. This process is called if one of the names of evaluation forms is selected by the user in the evaluation unit set selection directing element 17 and the "OK" button is pressed.

At first, the selected evaluation form name is obtained (step 31) and a set of evaluation units having the same name of evaluation form and the latest date of generation is retrieved from the evaluation unit set administering element 2 (step 32). Then it is determined whether the retrieved set of evaluation units is the same as that retained in the evaluation unit set retaining element 12 or not (step 33), and if they are the same, the process is completed.

In contrast with this, if they are different, the storage directing process for the set of evaluation units described above is executed (step 34, shown in FIG. 10), and the set of evaluation units retrieved from the evaluation unit set administering element 2 is read out and retained in the evaluation unit set retaining element 12 (step 35). A new identifier is provided to the set of evaluation units retained in the evaluation unit set retaining element 12 (step 36) and the process is completed.

Figure 14:
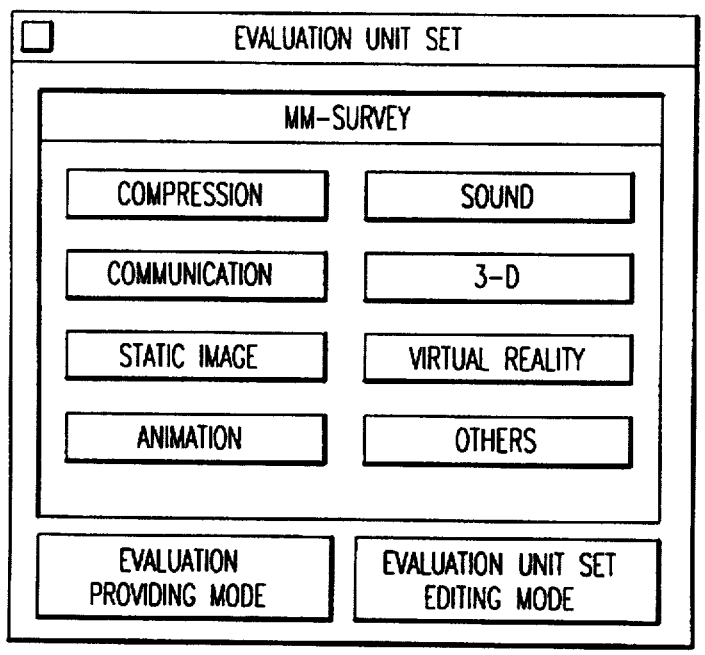
FIG. 14 illustrates another example of the display of a set of evaluation units on a screen.

Next, a specific example of the case where a necessary set of evaluation units is newly created utilizing a set of evaluation units used for evaluation in the past is now explained. In the example, the situation is assumed as follows. So far, a user nomura belonging to a group Multimedia-G has provided evaluation using the set of evaluation units having the name of evaluation form "MM-survey" including the evaluation units "Compression", "Communication", "Static image", "Animation", "Sound", "3-D", "Virtual reality" and "Others" as shown in FIG. 14 for surveying about multimedia. However, when there occurs necessity of providing evaluation about a patent, he does not know what should be used as the evaluation unit related to the patent. Therefore, he is going to select the set of evaluation units used by another member for providing evaluation to patents.

For obtaining the set of evaluation units for evaluation to the patents, it is necessary to fetch the evaluation forms used for evaluation in the past. For that purpose, a method is adopted that an information unit related to the patent is found at first, and subsequently the other evaluation forms used for evaluation of the information unit are fetched.

Figure 15:
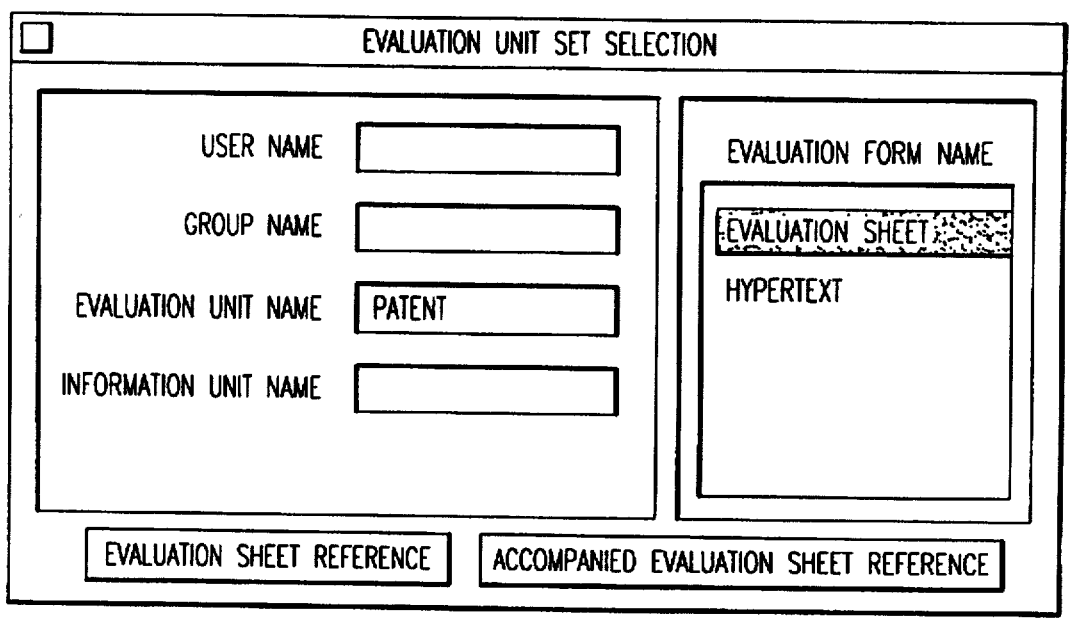
FIG. 15 illustrates another example of the display of a selected set of evaluation units on a screen.

To find the information unit related to the patent, as shown in FIG. 15, "Patent" is inputted as the name of evaluation form in the evaluation unit set selection directing element 17, whereby a history of executing classification and providing evaluation to "Patent" is searched in the evaluation history administering element 7.

Here, it is assumed that the history of evaluation administered by the evaluation history administering element 7 are as shown in FIG. 16. In this history information, as shown in the figure, the date of providing evaluation, the identifier of the user who provided the evaluation, the identifier of the set of evaluation units used for providing evaluation, the identifier of the associated evaluation unit, and the identifier of the object information unit are described. This evaluation history information administers all of the attributes by identifiers except the date, but for intelligibility, their names are also indicated in the brackets in the figure.

As described above, according to the user's designation of the name of the evaluation unit "Patent" as the condition of selection, the system selects the records to each of which evaluation is provided by the evaluation unit Eval12 whose evaluation unit name is "Patent" in the evaluation history in FIG. 16. By detecting the sets of evaluation units of the records, it is found that these records are "Form7 (evaluation sheet)" and "Form4 (Hypertext)" in the order of the evaluation date from the latest. Therefore, "Evaluation sheet" and "Hypertext" are displayed as the names of evaluation forms in the right-half side area in FIG. 15 for displaying the names of evaluation forms.

Figure 17:
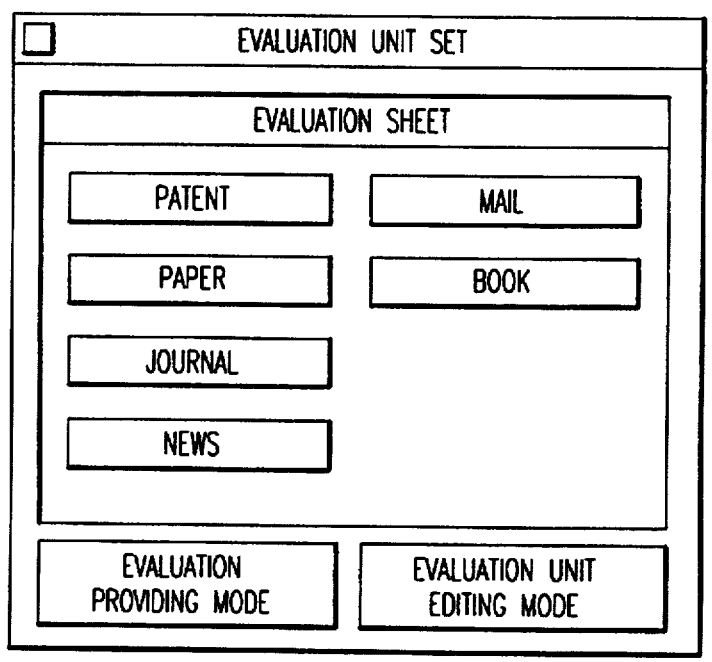
FIG. 17 illustrates another example of the display of a set of evaluation units on a screen.

In FIG. 15, if the user selects the "Evaluation sheet" and presses the "Evaluation sheet reference" button, the set of evaluation units with the evaluation form name "Evaluation sheet" is read out and retained in the evaluation unit set retaining element 12, as shown in FIG. 17. Here, the set of evaluation units which has been read out indicates the types of the information units and hold the evaluation units having the names of "Patent", "Paper", "Journal" and so forth.

In FIG. 15, if it is assumed that the user selects the "Evaluation sheet" and presses the "Evaluation sheet reference" button, at first the records whose evaluation unit set is "Evaluation sheet" and evaluation unit is "Patent" are selected in the evaluation history in FIG. 16. Moreover, since the information unit which is the object of evaluation at that time is "Japanese Patent Application Laid-Open No. 6-121214", other sets of evaluation units associated with this information unit are retrieved. In FIG. 16, there is only another record and its set of evaluation units is "Infringement survey sheet", and thereby the set of evaluation units is displayed as shown in FIG. 18.

Figure 18:
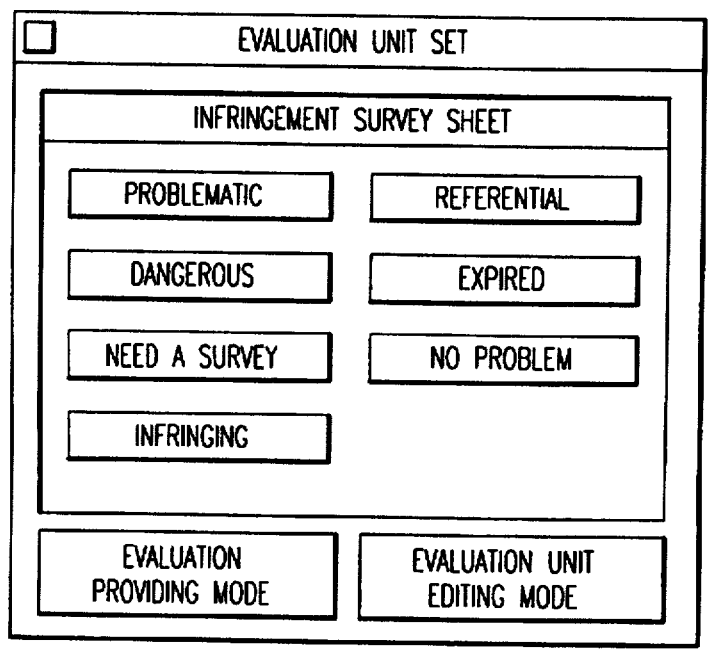
FIG. 18 illustrates another example of the display of a set of evaluation units on a screen.
Figure 19:
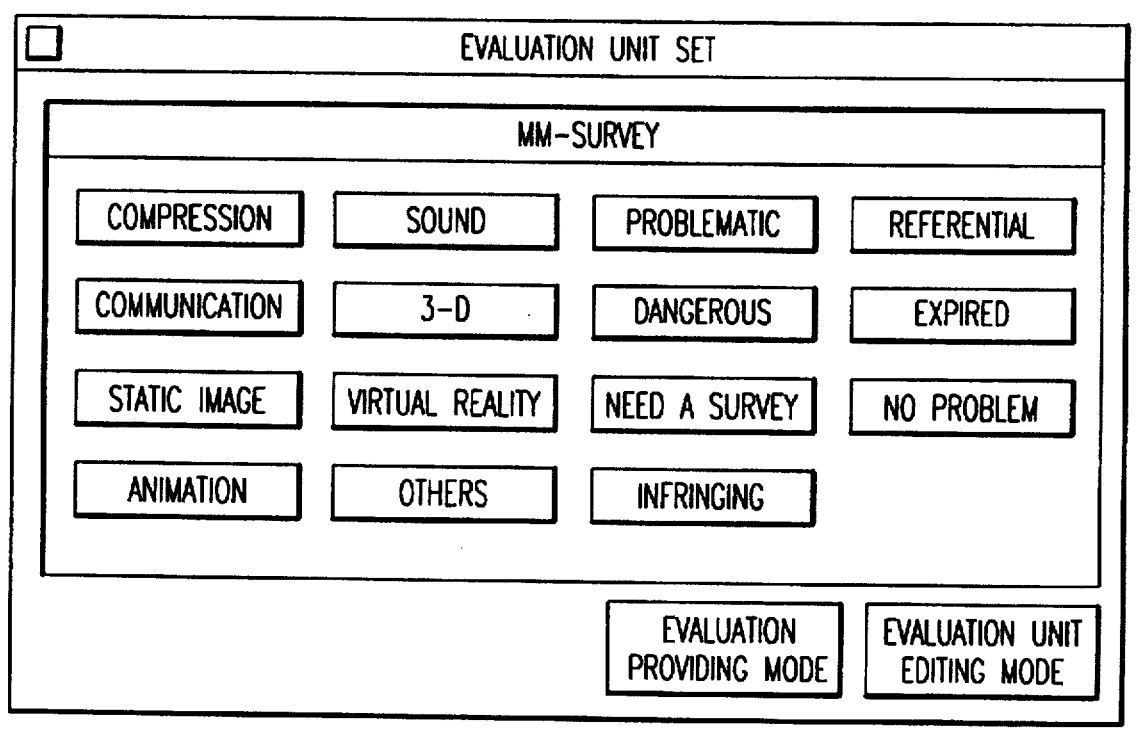
FIG. 19 illustrates an example of the display of an edited set of evaluation units on a screen.

As shown in FIG. 18, "Evaluation unit editing mode" button of the set of evaluation units "Infringement survey sheet" is selected, all of the evaluation units are copied (stored in a buffer). Then the set of evaluation units with the name of evaluation form "MM-survey" is opened and all evaluation units copied a little while ago are pasted therein from the buffer. Accordingly, the contents of the set of the evaluation units and the display thereof are as shown in FIG. 19, and simultaneously, the change flag is set to be on for indicating that the set of the evaluation units has been changed.

In this way, it is possible to create a necessary set of evaluation units by selecting a set of evaluation units utilizing the evaluation history and further selecting necessary evaluation units from the set of evaluation units.

In this embodiment, the data structure of the evaluation units retained by the evaluation unit administering element 3 is the list structure as shown in FIG. 3, but it is not limited thereto. It may be a tree structure which describes the parent-child relation between the evaluation units, or may be a network structure which describes the linkage relation between the evaluation units. Moreover, each evaluation unit may have the coordinates for determining the position of location in displaying the set of the evaluation units as well as the structure among the elements.

Second Embodiment

Next, the second embodiment of the information processing apparatus according to the present invention is now described. This embodiment of the information processing apparatus has a function of checking whether or not a set of evaluation units has been changed by the user himself/ herself or by others, and informing the result of checking to the user when he/she is going to provide evaluation or refer to the set of evaluation units.

The second embodiment of the information processing apparatus has the construction almost the same as that shown in FIG. 1, but an evaluation unit set detecting element is further added to the server 1, and a second evaluation unit set retaining element and a second evaluation unit set displaying element are added to the client 11.

The evaluation unit set detecting element disposed to the server 1 determines whether the set of evaluation units currently retained in the evaluation unit set retaining element 12 has the latest created date among the sets of evaluation units having the same name of evaluation form stored in the evaluation unit set administering element 2. If it does not have the latest date, the evaluation unit set detecting element notifies it to the user and detects the latest set of evaluation units in the evaluation unit set administering element 2.

In the case where the latest set of evaluation units in the evaluation unit set administering element 2 is detected by the evaluation unit set detecting element of the server 1, the second evaluation unit set retaining element disposed to the client 11 reads out the set of evaluation units and retains it. The second evaluation unit set displaying element disposed to the client 11 displays the set of evaluation units retained in the second evaluation unit set retaining element.

Figure 20A:
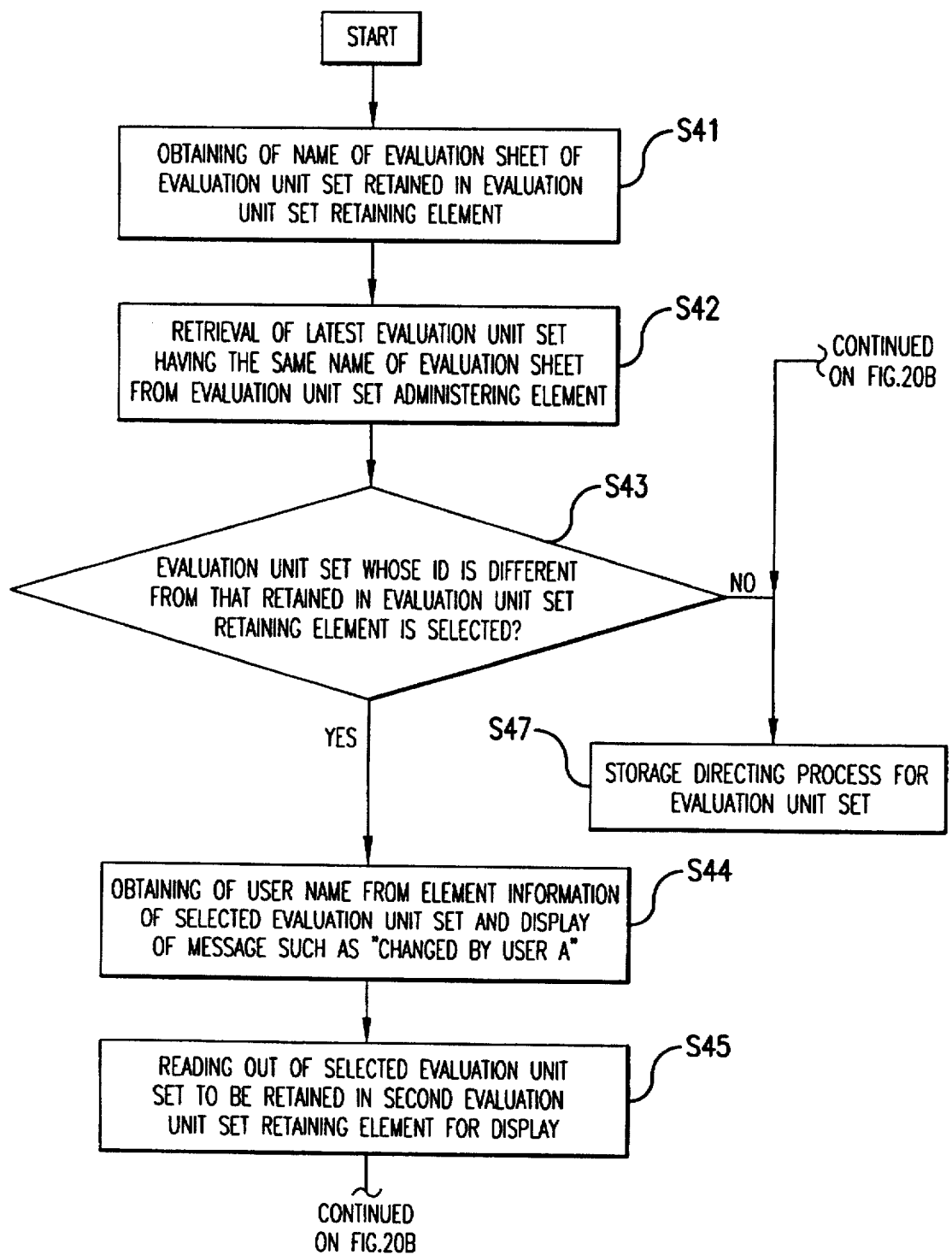
FIGS. 20A and 20B comprise a flowchart showing an example of procedures of a process of detecting the latest set of evaluation units in the second embodiment of the information processing apparatus according to the present invention.
Figure 20B:
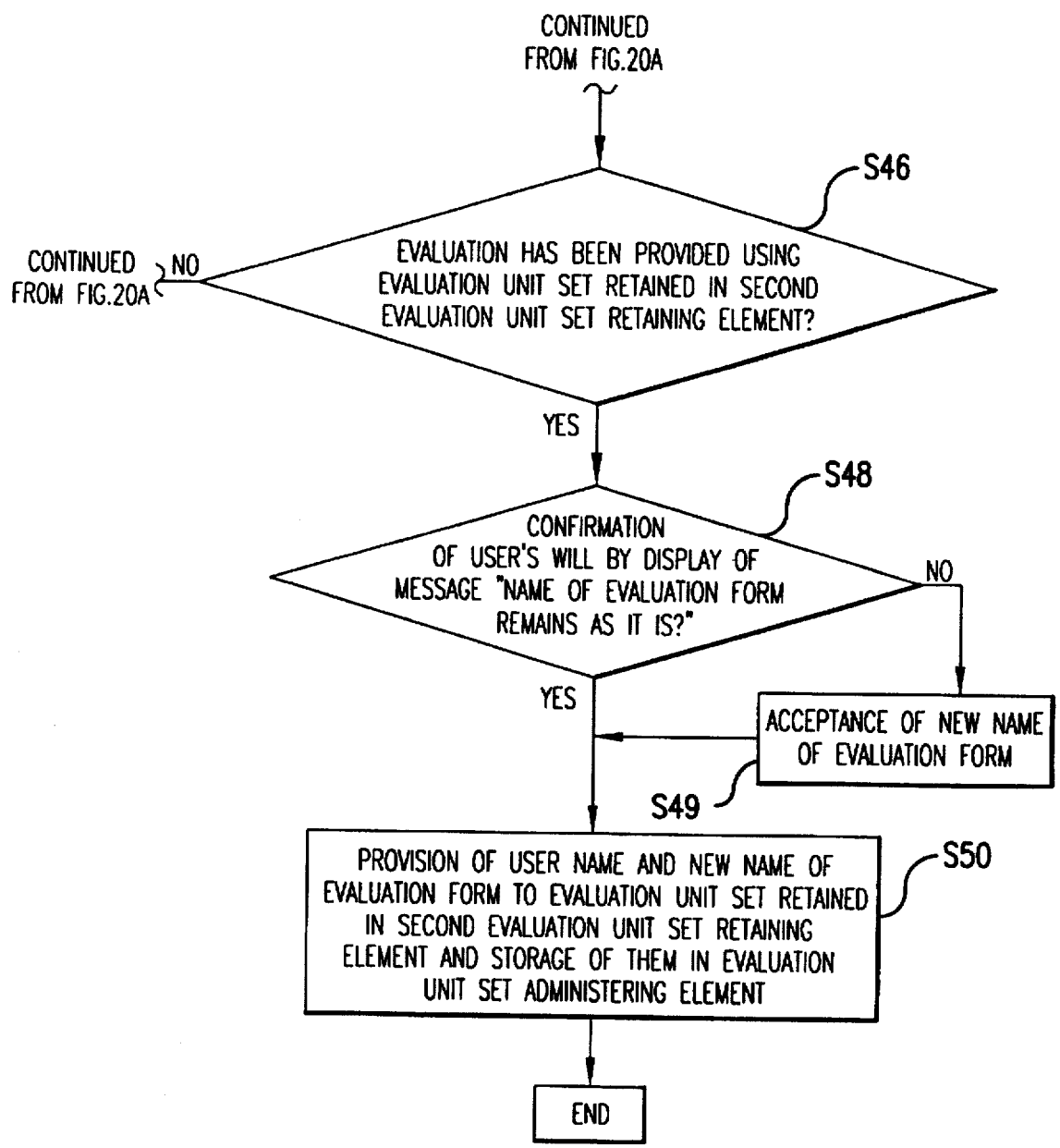

Next, the process of detecting the latest set of evaluation units when the evaluation is provided in this embodiment is described with reference to FIGS. 20A and 20B.

The process is called when one of the evaluation units included in the set of evaluation units retained in the evaluation unit set retaining element 12 is selected by the evaluation providing element 16. At first, an evaluation sheet name of the selected set of evaluation units is obtained (step 41), and in the evaluation unit set administering element 2, the latest one is retrieved from the sets of evaluation units having the same name of evaluation form (step 42).

Then it is examined whether the detected set of evaluation units and the set of evaluation units retained in the evaluation unit set retaining element 12 have the same identifier (step 43), and if they have the same identifier, the process proceeds to the storage directing process for the set of evaluation units (shown in FIG. 10) described above (step 47).

Otherwise, if they have different identifiers, the user name is obtained from the element information of the selected set of evaluation units, and the status that the editing has already been carried out is displayed and notified to the user by a message, for example, "Changed by user A" (step 44). After that, the selected set of evaluation units is retained in the second evaluation unit set retaining element and the contents are displayed and outputted (step 45).

Figure 10:
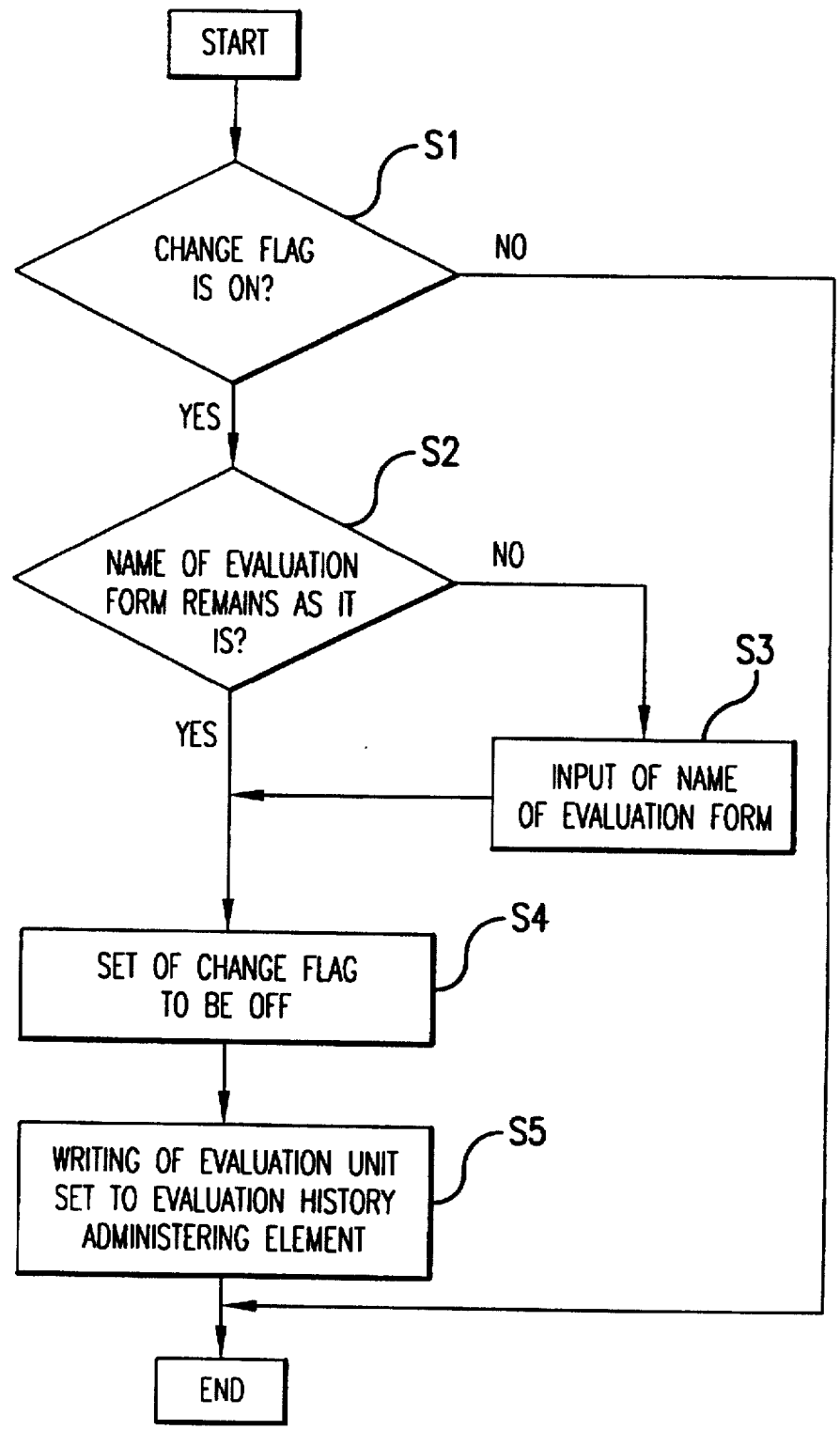
FIG. 10 is a flow chart showing an example of procedures of a storage direction process for a set of evaluation units.

Then it is examined whether the evaluation have been provided using the set of evaluation units retained in the second evaluation unit set retaining element or not (step 46), and if the evaluation have not been provided, the process proceeds to the storage directing process for the set of evaluation units (step 47, shown in FIG. 10). If the evaluation have been provided, the name of evaluation form of the set of evaluation units is confirmed by displaying a message, for example, "Do you want the name of evaluation form to remain as it is?" (step 48).

If the user inputs a new name of evaluation form, it is accepted (step 49) and then the user name and the new name of evaluation form are provided to the set of evaluation units retained in the second evaluation unit set retaining element, and these are stored in the evaluation unit set administering element 2 to be administered (step 50).

Next, another specific example is explained, in which a group executes classification and providing evaluation collaboratively. At first the same evaluation categories are used, and gradually each member uses a different version with one another. If someone in the group is going to use an old version of the evaluation categories after another member has changed them, the status is notified to the member who is going to use the old version of the evaluation categories.

Figure 21:
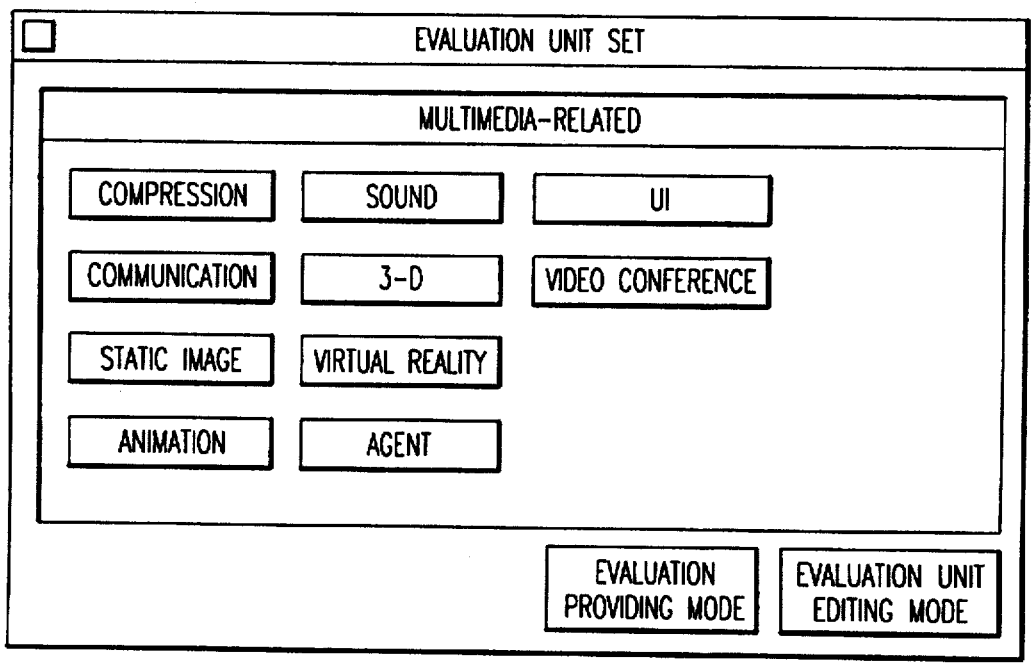
FIG. 21 illustrates the other example of the display of a set of evaluation units on a screen.

For instance, it is assumed that the evaluation about papers related to the multimedia were provided in a certain group using an evaluation sheet "Multimedia-related" which included the evaluation units "Compression", "Communication", "Static image", "Animation", "Sound", "3-D", "Virtual reality", "Agent", "UI" and "Video conference" as shown in FIG. 21.

Figure 22:
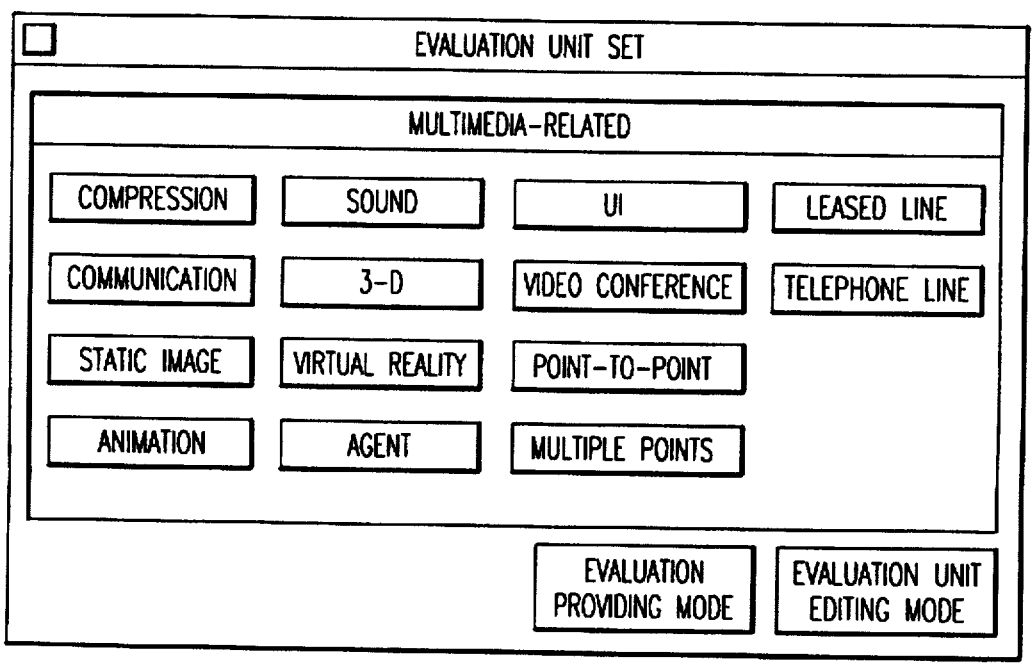
FIG. 22 illustrates another example of the display of an edited set of evaluation units on a screen.

With regard to this evaluation sheet, a user nomura in the group has wanted to carry out more detailed classification and evaluation for papers on video conference, in particular, and therefore he has added four evaluation units "Point-to-point", "Multiple points", "Leased line" and "Telephone line" to the evaluation sheet shown in FIG. 21 to create an evaluation sheet as shown in FIG. 22.

In the meantime, it is further assumed that another user hazama who has collaboratively provided evaluation with the user nomura uses the evaluation sheet shown in FIG. 21. If the user hazama is going to provide evaluation by associating, for example, the evaluation unit "Video conference" with a specific information unit, a message "The set of evaluation units has been rewritten by the user nomura" is displayed and the rewritten set of evaluation units is read out and inputted to the second evaluation unit set retaining element and displayed as shown in FIG. 23, in which the evaluation units added by the user nomura are emphasized.

As receiving such notification, the user hazama can provide evaluation using the set of evaluation units retained in the second evaluation unit set retaining element (shown in FIG. 21) as well as using the original set of evaluation units (shown in FIG. 22).

If the evaluation is to be provided using the set of evaluation units in the second evaluation unit set retaining element, the user name hazama is provided to the edited set of evaluation units shown in FIG. 22 and stored in the evaluation unit set administering element 2. Consequently, for the user hazama, this set of evaluation units corresponds to the evaluation form name "Multimedia-related" from the next time.

To the contrary, if the evaluation is provided using the original set of evaluation units instead of the set of evaluation units retained in the second evaluation unit set retaining element, the evaluation sheet "Multimedia-related" of the user hazama remains as it is as shown in FIG. 21.

Figure 24:
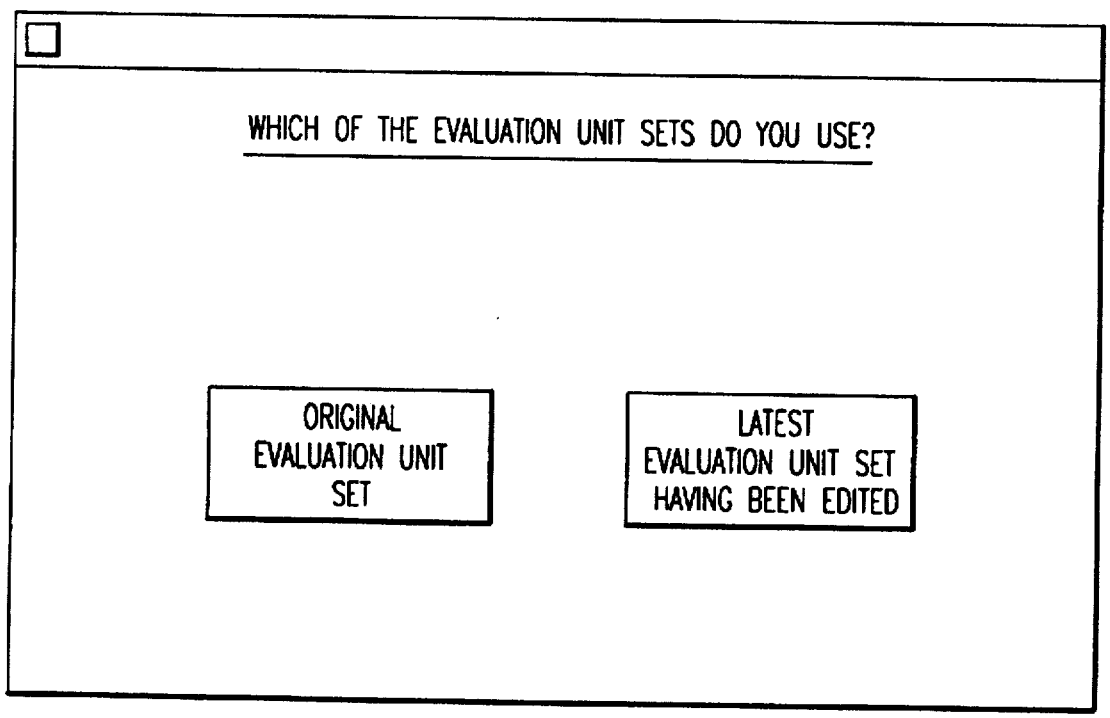
FIG. 24 illustrates an example of a display of a confirmation window for selecting a set of evaluation units on a screen.

To select either original set of evaluation units shown in FIG. 23 or the new set of evaluation units, it is possible to display a confirmation window having buttons for selecting either of them together with these sets of evaluation units as shown in FIG. 24.

Moreover, in FIG. 23, if the user hazama has provided evaluation using the second set of evaluation units, it is also possible to display a confirmation message such as "Do you use the current set of evaluation units from the next time?" to the user, and on condition that the confirmation is obtained from the user, the storage of the second set of the evaluation units to the evaluation unit set administering element 2 can be carried out.

In this embodiment, the evaluation unit set detecting element detects the latest set of evaluation units when the evaluation is provided, but it may be possible to detect the latest set of evaluation units having the same name of evaluation form when the evaluation unit associated with the information unit is referred to.

Moreover, when the evaluation unit set editing element 14 conducts editing such as addition, deletion, change or the like of the evaluation units in a set of evaluation units, the evaluation unit set detecting element can detect the latest set of evaluation units having the same name of evaluation form.

Furthermore, after editing a set of evaluation units, a list of the objects affected by editing can be displayed so that evaluation may be re-provided to all of those objects at once.

When the evaluation unit associated with the information unit is referred to, if there exists the latest set of evaluation units within the sets of evaluation units having the name of evaluation form same with that of the set of evaluation units to which evaluation is now provided, the difference between the set of evaluation units used for providing evaluation to the information unit and the latest set of evaluation units is displayed with emphasis so that the differences between the evaluation units of those sets of evaluation units may be easily understood, whereby review and change of the evaluation result in the past can be supported.

Moreover, to detect the latest set of evaluation units by the evaluation unit set detecting element, it is possible to detect the latest set of evaluation units from those user himself/herself has created, or to detect it from those user himself/herself has used in the past, or to detect it from those limited to be used by a specific user, or to detect it from those limited to be used by the users belonging to a specific group.

As described above, according to the present invention, by which evaluation category (set of evaluation units) the evaluation have been provided to a data object such as a document is stored and administered by the evaluation history administering element; therefore, the user can select the necessary categories based on the evaluation history in the past and further extract the necessary evaluation category.

In the case where the set of evaluation units is changed, process of re-providing of evaluation against the evaluation result created by the set of evaluation units before changing is required. However, in the present invention, information such that to which information unit evaluation is provided by which set of evaluation units, how different the set of evaluation units and the latest set of evaluation units having the same name of evaluation form are, and so forth, are administered, and thereby it is possible to guide and support re-providing evaluation.

The foregoing description of preferred embodiments of this invention has been presented for purpose of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information processing apparatus for providing evaluation information to a data object, comprising:

an information unit administering element for administering a data object to be an object of evaluation;

an evaluation unit set administering element for storing a plurality of sets of evaluation units, each of which includes a plurality of evaluation units used for evaluation;

an evaluation unit set editing element for editing at least one of the plurality of evaluation units in one of the plurality of sets of evaluation units stored in said evaluation unit set administering element;

a storage directing element for directing the set of evaluation units in which at least one of the plurality of evaluation units has been edited by said evaluation unit set editing element to be stored in said evaluation unit set administering element;

an evaluation providing element for associating one of the plurality of evaluation units in one of the plurality of sets of evaluation units with the data object to be the object of evaluation in accordance with a user's direction; and an evaluation providing history administering element for storing a result of evaluation including information about relation of association among the data object, the evaluation unit associated with the data object by said evaluation providing element and the set of evaluation units used for evaluation.

2. An information processing apparatus for providing evaluation information to a data object, comprising:

an information unit administering means for administering a data object to be an object of evaluation;

an evaluation unit set administering means for storing a plurality of sets of evaluation units, each of which includes a plurality of evaluation units used for evaluation;

an evaluation unit set editing means for editing at least one of the plurality of evaluation units in one of the plurality of sets of evaluation units stored in said evaluation unit set administering means;

a storage directing means for directing the plurality of sets of evaluation units in which at least one of the plurality of evaluation units has been edited by said evaluation unit set editing means to be stored in said evaluation unit set administering means;

an evaluation providing means for associating one of the plurality of evaluation units in one of the plurality of sets of evaluation units with the data object to be the object of evaluation in accordance with a user's direction; and an evaluation providing history administering means for storing a result of evaluation including information about relation of association among the data object, the evaluation unit associated with the data object by said evaluation providing means and the set of evaluation units used for evaluation.

3. The information processing apparatus as set forth in claim 1, further comprising:

an evaluation unit set retrieving element for retrieving one of the plurality of sets of evaluation units stored in said evaluation unit set administering element using the information about relation of association in the result of evaluation as a retrieving key.

4. The information processing apparatus as set forth in claim 3, wherein the result of evaluation stored in said evaluation providing history administering element further includes a user identifier of an evaluator, and said evaluation unit set retrieving element retrieves one of the plurality of sets of evaluation units used by the evaluator who provided evaluation based on the user identifier.

5. The information processing apparatus as set forth in claim 3, further comprising:

a group administering element for administering a group including a plurality of evaluators who previously provided evaluation, wherein the result of evaluation stored in said evaluation providing history administering element further includes a user identifier of an evaluator who provided evaluation, and said evaluation unit set retrieving element retrieves one of the plurality of sets of evaluation units used by an evaluator belonging to a designated group.

6. The information processing apparatus as set forth in claim 1, wherein said evaluation unit administering element further stores identifying information of the set of evaluation units used for evaluation and a date of storing of the set of evaluation units used for evaluation, further comprising:

an evaluation unit set detecting element for detecting a set of evaluation units having the same identifying information with the set of evaluation units used for evaluation of a specific result of evaluation stored in said evaluation providing administering element and having a latest date of being stored in said evaluation unit administering element, wherein the set of evaluation units having the latest date of being stored detected by said evaluation unit set detecting element is associated with the specific result of evaluation.

7. The information processing apparatus as set forth in claim 6, wherein said evaluation unit set detecting element detects the latest set of evaluation units when the set of evaluation units including the evaluation unit associated with the data object is referred to.

8. The information processing apparatus as set forth in claim 6, wherein said evaluation unit set detecting element detects the latest set of evaluation units when the set of evaluation units including the evaluation unit associated with the data object is read out so that at least one of the plurality of evaluation units in the set of evaluation units is edited.

9. The information processing apparatus as set forth in claim 1, further comprising:

an affected object extracting element for extracting a data object to which evaluation has been provided by a set of evaluation units when at least one of the plurality of evaluation units in the set of evaluation units is edited based on the result of evaluation.

10. An information processing method for providing evaluation information to a data object, comprising the steps of:

editing at least one of a plurality of evaluation units in one of a plurality of sets of evaluation units for providing evaluation to the data object;

associating one of the plurality of evaluation units which has been edited in the set of evaluation units with the data object in accordance with a user's designation; and storing a result of evaluation including information about relation of association among the data object, the evaluation unit associated with the data object and the set of evaluation units used for evaluation.

11. An information processing apparatus comprising:

an information unit administering element for storing a data object to be an object of evaluation;

an evaluation unit set administering element for storing a plurality of sets of evaluation units, each of which includes a plurality of evaluation units used for evaluation;

a first evaluation providing element for associating one of the plurality of evaluation units in one of the plurality of sets of evaluation units stored in said evaluation unit set storing element with the data object to be the object of evaluation in accordance with a user's direction;

an evaluation unit set editing element for editing at least one of the plurality of evaluation units in one of the plurality of sets of evaluation units stored in said evaluation unit set storing element;

a storage directing element for directing the set of evaluation units in which at least one of the plurality of evaluation units has been edited by said evaluation unit editing element to be stored in said evaluation unit set storing element;

a notifying element for notifying a user directing association of the evaluation unit which has been edited with the data object by said first evaluation providing element when the set of evaluation units including the edited evaluation unit is directed to be stored by said storage directing element that the evaluation unit used for evaluation has been edited and changed;

a re-evaluation providing direction accepting element for accepting direction from the user notified by said notifying element as to whether re-evaluation is provided or the current evaluation is adopted;

an evaluation unit re-storing element for storing the set of evaluation units in which at least one of the plurality of evaluation units has been edited by said evaluation unit editing element in said evaluation unit set administering element instead of the set of evaluation units before editing by said evaluation unit set editing element if the direction accepted by said re-evaluation direction accepting element is to provide re-evaluation;

a second evaluation providing element for associating one of the plurality of evaluation units in the set of evaluation units stored in said evaluation unit set storing element by said evaluation unit re-storing element with the data object to be the object of evaluation in accordance with the user's direction;

an evaluation unit adding element for storing the set of evaluation units in which at least one of the plurality of evaluation units has been edited by said evaluation unit editing element in said evaluation unit set administering element as a new set of evaluation units different from the set of evaluation units before editing by said evaluation unit set editing element if the direction accepted by said re-evaluation direction accepting element is that the current evaluation should be adopted; and an evaluation providing history administering element for storing a result of evaluation including information about relation of association among the data object, the evaluation unit associated with the data object by one of said first evaluation providing element and said second evaluation providing element and the set of evaluation units used for evaluation.

* * * * *